United States Patent [19]

Kaestner

[11] 3,813,169

[45] May 28, 1974

[54] DEVICE FOR DETERMINING POSITION AND FOCUS OF AN OPTICAL MEMBER

[76] Inventor: Paul T. Kaestner, 246 Bay Ave., Huntington, N.Y.

[22] Filed: Jan. 2, 1973

[21] Appl. No.: 320,315

[52] U.S. Cl.................. 356/127, 356/124, 356/153, 356/172
[51] Int. Cl. ............................................. G01b 9/00
[58] Field of Search ............ 356/124, 127, 153, 172

[56] References Cited
UNITED STATES PATENTS

| | | | |
|---|---|---|---|
| 2,352,179 | 6/1944 | Bolsey | 356/153 |
| 3,447,874 | 6/1969 | Back | 356/124 |
| 3,572,939 | 3/1971 | Burdick | 356/124 |

*Primary Examiner*—Ronald L. Wibert
*Assistant Examiner*—Paul K. Godwin
*Attorney, Agent, or Firm*—Stephen E. Feldman

[57] ABSTRACT

Apparatus for determining the alignment in the direction transverse of the optical axis of a lens and/or its focus. The apparatus includes a light beam generating means and means for providing output signals which indicate lateral or angular displacement of the optical axis of the lens with respect to the optimum axis or the axis of the apparatus and the focus or relation to the position of optimum focus of the lens. Another configuration provides means for accurately determining the magnification of an image produced by an optical system in addition to determination of optimum focus.

19 Claims, 29 Drawing Figures

PATENTED MAY 28 1974 3,813,169

R LIGHT FLUX VARIATION

DEVICE FOR DETERMINING POSITION AND FOCUS OF AN OPTICAL MEMBER

BACKGROUND OF THE INVENTION

This invention relates to optical systems and particularly to optical systems for determining whether a lens is properly positioned axially and whether the lens has its principal axis in the proper position.

Lenses very often are not positioned correctly in a direction transverse to their optical axis. This incorrect positioning can lead to a lens being mounted in a manner such that the center of the lens will not be in the correct axial position. Combined with this very often the lens will not be properly structured, the optical center of the lens will not be positioned coincidental with the center of the circumference of the lens. This situation may cause the lens itself to be useless since it will not have been structured properly.

However, in the above cases where the lens is wrongly positioned, it would be quite useful if its axes were properly positioned. It is then important that a device be developed that will readily determine whether a lens is properly positioned in a direction transverse of its optical axis and also whether the lens is properly structured in a direction transverse to its optical axis.

At present there is no mechanism that can efficiently accomplish this result. There have been some attempts, but none has resulted in successfully providing a mechanism that will accomplish this result.

In many types of equipment a mechanism like this is needed, as in the fields of photography and optics where it is quite important that lenses be positioned and structured correctly.

SUMMARY OF THE INVENTION

An apparatus for determining the transverse alignment of a lens and/or the accurate focal length of a lens. A light beam produced having a slit source directed through the optic element passes through means for generating an output signal. This signal is then compared with a reference signal to determine the transverse alignment and/or focus of the lens. This latter means comprises a rotating cylindrical chopper and a photoelectric sensor. A second reference signal provides means for comparison with the output signal to determine the lens position. In addition illuminated patterns located at the plane of the slit source provide means for measuring magnification at the plane of the image.

The present invention provides a signal generating system including a sensor for converting light into an electric signal. When the image of an illuminated slit is produced in a certain location, a uniform light flux is produced on the photosensor. In this condition, the signal generating means produces a null. Shift of the slit image from the location produces a fluctuating light flux at the sensor having a phase characteristic which depends on whether the image is fore or aft of its desired location, or to the left or right of the desired location.

In response to the fluctuating light, a signal is produced having a phase corresponding to the position of the image. This signal is compared with a reference signal, producing an output signal indicating the direction for corrective action for optimum transverse alignment; a second signal indicates corrective action for optimum focus. The output signal can be used as an error signal for servo control of the lens, mirror or other element in an optical system.

PREFERRED EMBODIMENT OF THE INVENTION

Figure 1:
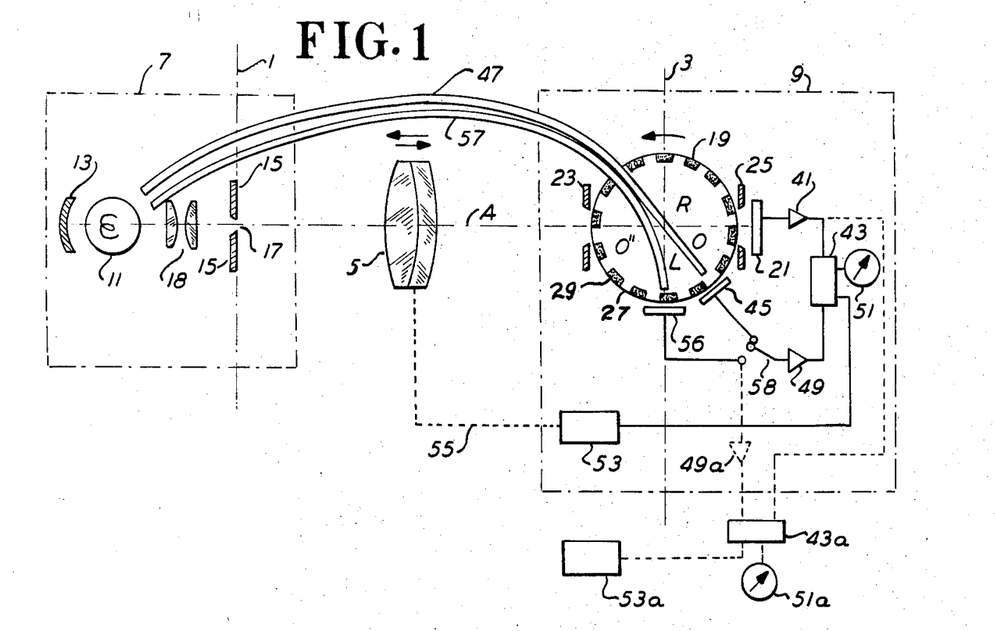
FIG. 1 is a schematic plan diagram of the present invention using a rotating cylindrical chopper.

The apparatus comprises a transmitter 7 and a receiver 9, with the lens 5 to be evaluated positioned therebetween. Transmitter 7 includes a light source 11, a reflector 13 and light shield 15 containing a slit aperture 17. A condensing lens 18 concentrates light from the source 11 through slit 17. Slit 17 defines the object plane 1 (hereinafter discussed in more detail).

Receiver 9 includes a rotary chopper 19 (hereinafter described in more detail) and photoelectric sensor 21. When lens 5 is properly adjusted, a slit image of the illuminated slit 17 is produced at 0 (the center of the chopper) in image plane 3.

Lens 5 is to be positioned to focus an object at object plane 1 at the image plane 3.

As hereinafter more particularly described, when the slit image is formed at axis 0 of the chopper, a light flux variation of negligible amplitude is received by sensor 21 and a null signal is produced by a signal conditioning system, as hereinafter described, thereby indicating that the slit image is positioned at the focal plane and is centered on the optical axis. When the slit image lies fore or aft of the central axis O, e.g., at O' or O'', then sensor 21 detects a fluctuating light flux with a 180° phase shift corresponding to whether the slit image is fore or aft of the center O of the chopper 19. When the slit image lies to the right or left of the optical axis in the image plane through O, e.g., at L or R, sensor 21 detects a fluctuating light flux with a 180° phase shift corresponding to whether the slit image is right or left of the optical axis. Each of 180° phase shifts, focal and lateral, are phased at 90° with respect to each other and are obtained for image position at O', L, O'' and R respectively.

Light shields 23 and 25 are provided for limiting the angles of convergence to and divergence from the slit image. They are located with their openings centered on the optical axis (A) and are equidistant from the center of the chopper, point O.

Chopper 19 comprises a tubular member having a plurality of slots 27 and bars 29, odd in number and parallel to the chopper axis of rotation. As hereinafter explained, the odd number of slots 27 and bars 29 produce the phase shift hereinbefore referred to. Each bar 29 is diametrically opposite a slot 27. All the bars 29 and all the slots 27 are of equal width but the slots need not necessarily have widths equal to the bars.

Chopper 19 is adapted to be driven by any conventional drive means (not shown) at a uniform speed. The speed will govern frequency of the pickup by sensor 21 and may be at a high rate suitable for servo control.

In order to illustrate the phase shifts hereinbefore described, FIGS. 3, 4, 6, 8 and 10 illustrate a succession of rotational positions of chopper 19. An angular rotation equivalent to the angular width of one slot and one bar provides one cycle of the repeating light flux pattern which produces one 360° cycle of the repeating electrical signal from sensor 21.

Figure 3A:
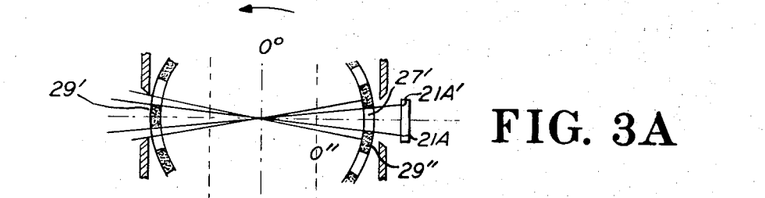
FIGS. 3A, 3B, 3C and 3D show the chopper of FIG. 1 in successive rotational positions with light passing through the chopper to form an image at its center.
Figures 3B, 3C:
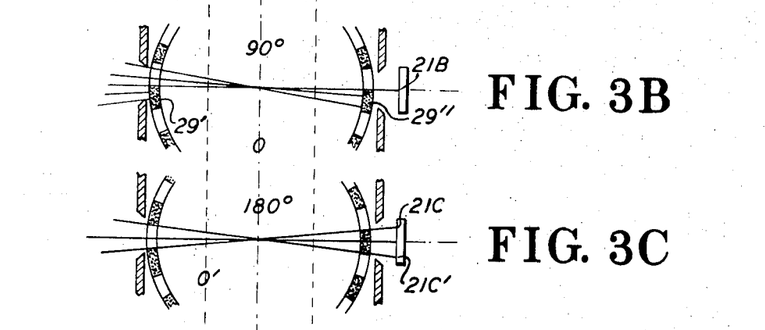
Figure 3D:
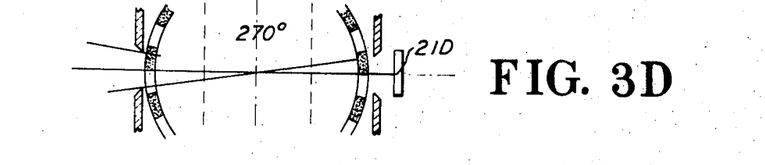

FIG. 3A shows a condition wherein a bar 29' is centered on the optical axis on the input side of the chopper. With an odd number of slots, this positions a slot 27' on the opposite side also centered on the optical axis. With the input and output so limited, using bars and slots of equal width and a slit image of negliglble width at position O, only two rays of zero angular subtense (negligible light magnitude) are received at two locations as indicated at 21A and 21A'. In FIG. 3B, the chopper 19 has rotated counterclockwise one-half a bar width so that the edge of bar 29' is aligned with the optical axis. With the input and output so limited, a zero angular subtense ray is received at 21B. In FIG. 3C the chopper is again rotated one-half a bar width to produce two zero subtense rays at 21C and 21C'. In FIG. 3D, the chopper is again rotated one-half a bar width. A single zero subtense light ray is received at 21D. Accordingly the output of light for slit image located at O is negligible for all chopper positions.

Figure 4A:
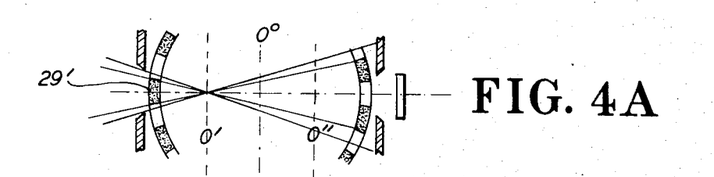
FIGS. 4A, 4B, 4C and 4D are views similar to FIGS. 3A, 3B, 3C and 3D except that the image is focused short of the center of the chopper.
Figure 4B:
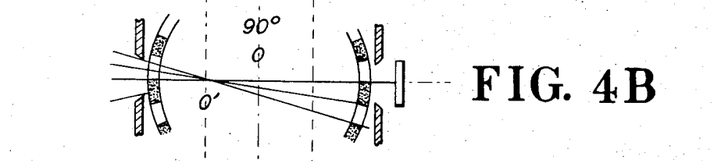
Figure 4C:
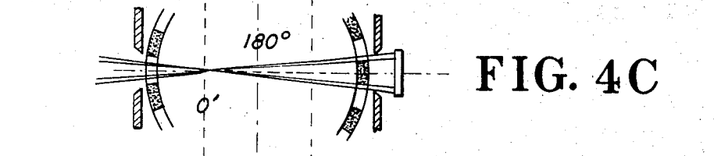
Figure 4D:
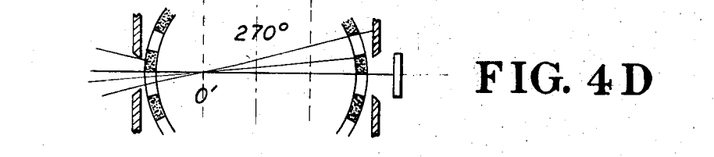
Figure 5:
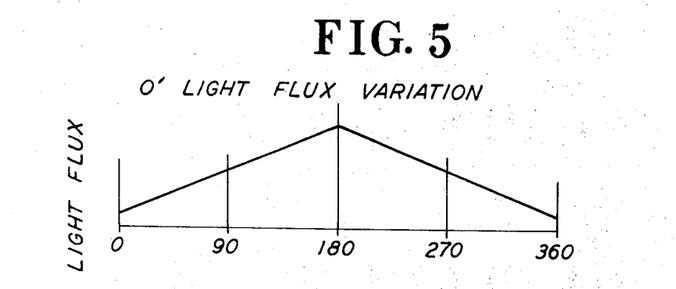
FIG. 5 is a graph illustrating the variation in light flux through one of the repeated light flux patterns generated when the light image is positioned as in FIG. 4.
Figure 6A:
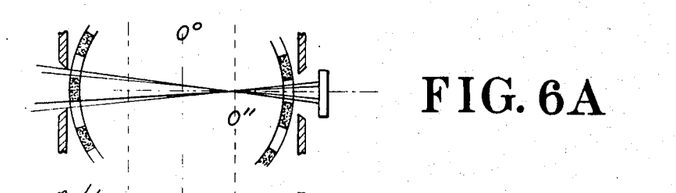
FIGS. 6A, 6B, 6C and 6D are also views similar to FIGS. 3A, 3B, 3C and 3D except that the image is focused aft of the center of the chopper.
Figure 6B:
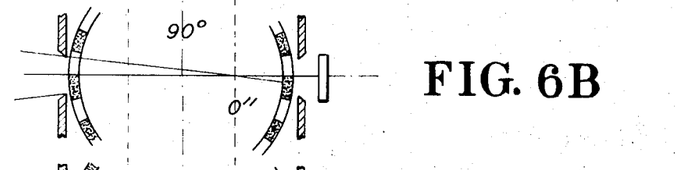
Figure 6C:
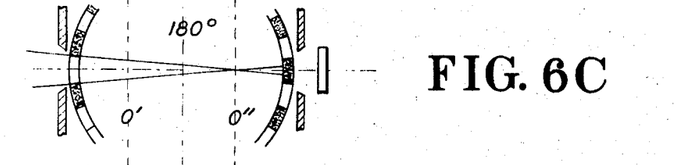
Figure 6D:
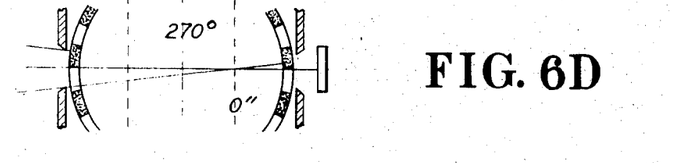

Referring now to FIGS. 4 and 5, light flux impinging on sensor 21 is illustrated when the image is focused in an image plane O' short of the center of the chopper. FIG. 4 shows the chopper rotated to the same angular positions illustrated in the FIG. 3 series.

In FIG. 4A, the input bar 29' prevents light from passing through the chopper. FIG. 4B allows a ray of zero subtense to pass. FIG. 4C allows substantial light to reach the sensor. In FIG. 4D a ray of zero subtense is passed.

FIG. 5 is a plot of the light flux variation for an image at O' as a function of chopper angular positions illustrated in FIGS. 4A, 4B, 4C and 4D. For a slit image of negligible width or in a case where the width of bars 29 exceed the width of slots 27 by an amount corresponding to half the width of the slit image, no light passes through the chopper in the 0°–90° and 270°–360° ranges. For finite width images where the width of bars 29 is less than a half slit image width greater than the width of slots 27, a light flux variation having minimum values at 0° and 360° and maximum at 180° is shown in FIG. 5.

Figure 7:
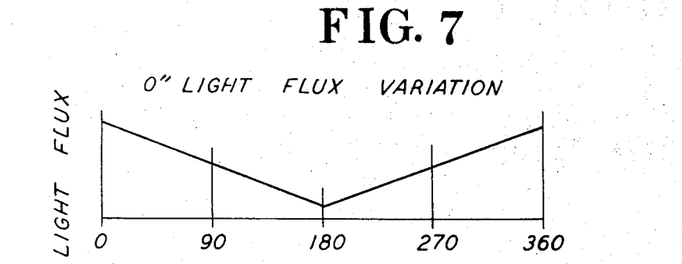
FIG. 7 is a graph similar to the graph of FIG. 5 except that it shows a phase shift of 180° from that of FIG. 5 due to the light image appearing aft of the center as in FIG. 6.
Figure 8A:
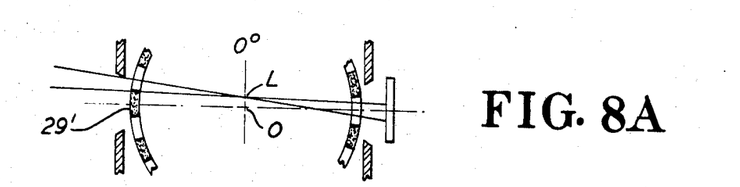
FIGS. 8A, 8B, 8C and 8D are also views similar to FIGS. 3A, 3B, 3C and 3D except that the image is focused at the left of the center of the chopper.
Figure 8B:
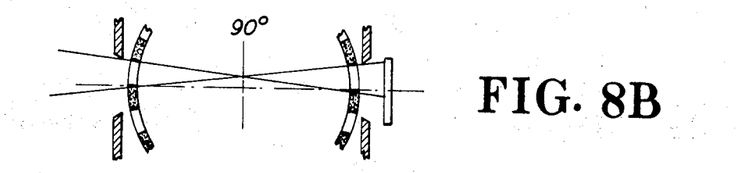
Figure 8C:
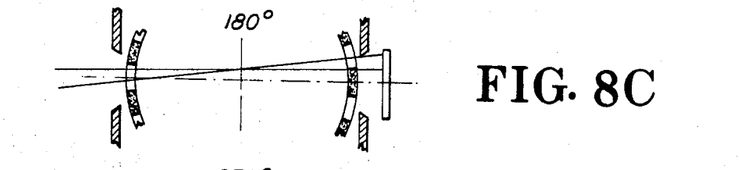
Figure 8D:
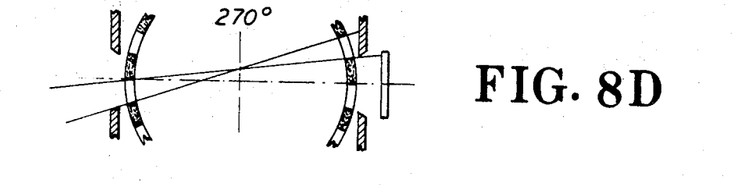

FIGS. 6 and 7 illustrate the light flux impinging on sensor 21 when the slit image is focused in image plane O'' beyond the center O of the chopper. The same angular rotated chopper positions as in FIG. 3 are shown. As illustrated, only in FIG. 6A does sensor 21 receive substantial light through the chopper 19.

FIG. 7 is a plot of the light flux variation for an image at O'' as a function of chopper angular positions illustrated in FIGS. 6A, 6B, 6C and 6D. As in the conditions described for FIG. 5, a light flux variation having, for this case, minimum value at 180° and maximum at 0° and 360° is obtained. Comparison of FIGS. 5 and 7 shows that a 180° phase shift in output occurs dependent on whether the image falls short of or beyond O.

Figure 9:
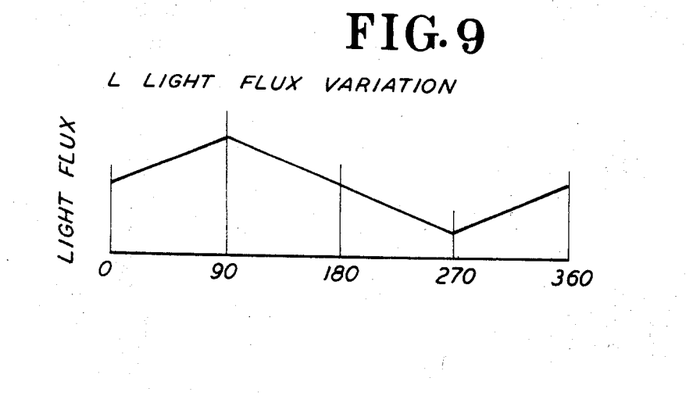
FIG. 9 is a graph, similar to the graph of FIG. 5 except that it shows a phase shift of 90° from that of FIG. 5 due to the light image appearing to the left of the center as in FIG. 8.
Figure 10A:
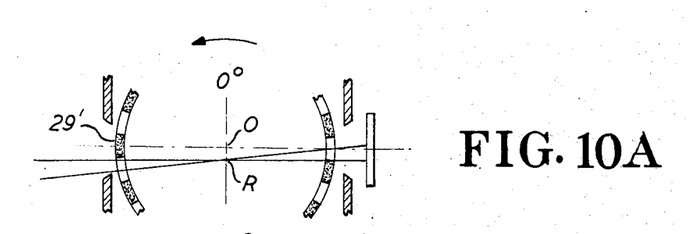
FIGS. 10A, 10B, 10C and 10D are also views similar to FIGS. 3A, 3B, 3C and 3D except that the image is focused at the right of the center of the chopper.
Figure 10B:
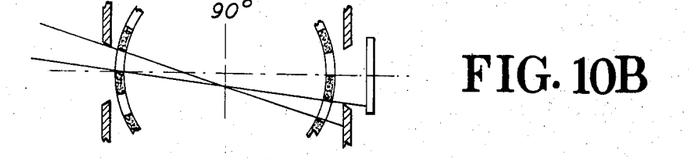
Figure 10C:
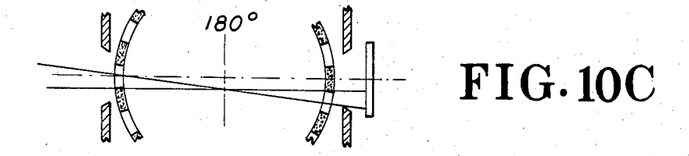
Figure 10D:
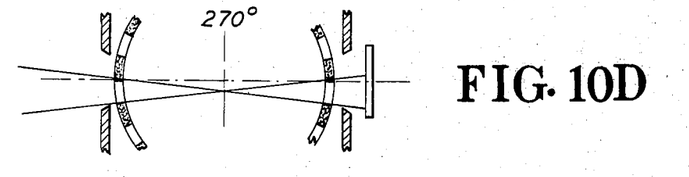

FIGS. 8 and 9 illustrate the light flux impinging on sensor 21 when the slit image is focused at image point O but displaced lateral to the optical axis to point L, to the left of center O of the chopper. The same angular rotated chopper positions as in FIG. 3 are shown. As illustrated in FIG. 8B maximum light flux is passed to the sensor 21 with none in FIG. 8D.

FIG. 9 is a plot of the light flux variation for an image at L as a function of chopper angular positions illustrated in FIGS. 8A, 8B, 8C and 8D. As in the conditions described for FIG. 5, a light flux variation, having, in this case, minimum value at 270° and maximum at 90° is obtained. Comparison of FIGS. 5 and 9 shows that a 90° phase shift in output occurs between the two slit image positions represented therein.

Figure 11:
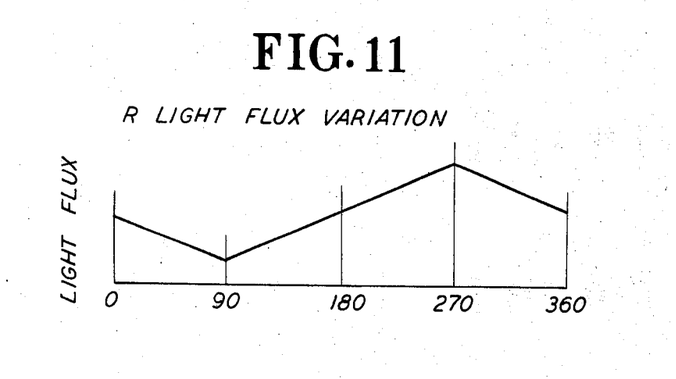
FIG. 11 is a graph similar to the graph of FIG. 5 except that it shows a phase shift of 270° from that of FIG. 5 due to the light image appearing to the right of the center as in FIG. 1D.

FIGS. 10 and 11 illustrate the light flux impinging on sensor 21 where the slit image is focused at image plane O but displaced lateral to the optical axis to point R, to the right of center O of the chopper. The same angular rotated chopper positions as in FIG. 3 are shown. As illustrated, maximum light flux is passed to the sensor 21 in FIG. 10D, with none in FIG. 10B.

FIG. 11 is a plot of the light flux variation for an image at R as a function of chopper angular positions illustrated in FIGS. 10A, 10B, 10C and 10D. As in the conditions described for FIG. 5, a light flux variation, having, in this case, minimum value at 90° and maximum at 270°, is obtained. Comparison of FIGS. 9 and 11 show a 180° phase shift in output occurs dependant on whether the image falls to the left or right of O.

Again referring to FIG. 1, the output from sensor 21 is amplified at 41. The amplified signal is conducted to a phase sensitive detector 43 where it is compared with the fixed reference signal from amplifier 49 to detect focus or to detect lateral image shift. If the signal to amplifier 49 comes from sensor 56 lateral image shift will be detected whereas if it comes from sensor 45, focus will be detected.

The phase sensitive detector is conventional and may be of the type described in "Theory of Servomechanisms," pages 111–114, by Nicholls et. al, published by McGraw Hill, 1947.

The lateral displacement reference signal is the output from a sensor 56 which is processed through amplifier 49. The phase of this signal is adjusted to provide optimum sensitivity to image lateral shifts. Also, a reference signal which is the output from a sensor 45 can be processed through amplifier 49 by use of selector switch 58. The phase of this signal is adjusted to provide optumum sensitivity to image focal shifts. Sensors 45 and 56 receive light through one side of chopper 19. The light impinging on sensor 45 and 56 are fed from lamp 11 by fiber optics 47 and 57 respectively.

In applications where both focus and lateral image shift output electrical indications are required simultaneously, an additional amplifier 49A, phase sensitive detector 43A and applicable output devices 51A and/or servo device 53A can be added to the system as shown by the dotted lines in FIG. 1. In this case switch 58 will be deleted. Alternatively the lateral phase shifted reference output may be generated by processing the focus reference signal through phase lag or phase lead circuits to produce the desired 90° phase shift between the two output signals.

By receiving light through chopper 19, the outputs of sensors 45 and 56 provide phase locked reference signals having the same frequency as the output from sensor 21 since all three signals pass through the chopper.

Phase sensitive detector 43 compares the outputs from sensors 21 and 45 or from sensors 21 and 56 to provide output signals having magnitudes and polarities corresponding to the distance and direction the slit image is displaced from the center of chopper 19. The resulting output signal is fed to an indicator 51 to indicate the direction for corrective action. An alternative, and in addition, the signal may be fed to a servo control 53 and by suitable linkage 55 lens 5 can be driven automatically to the position of best focus and/or best lateral alignment.

Figure 2:
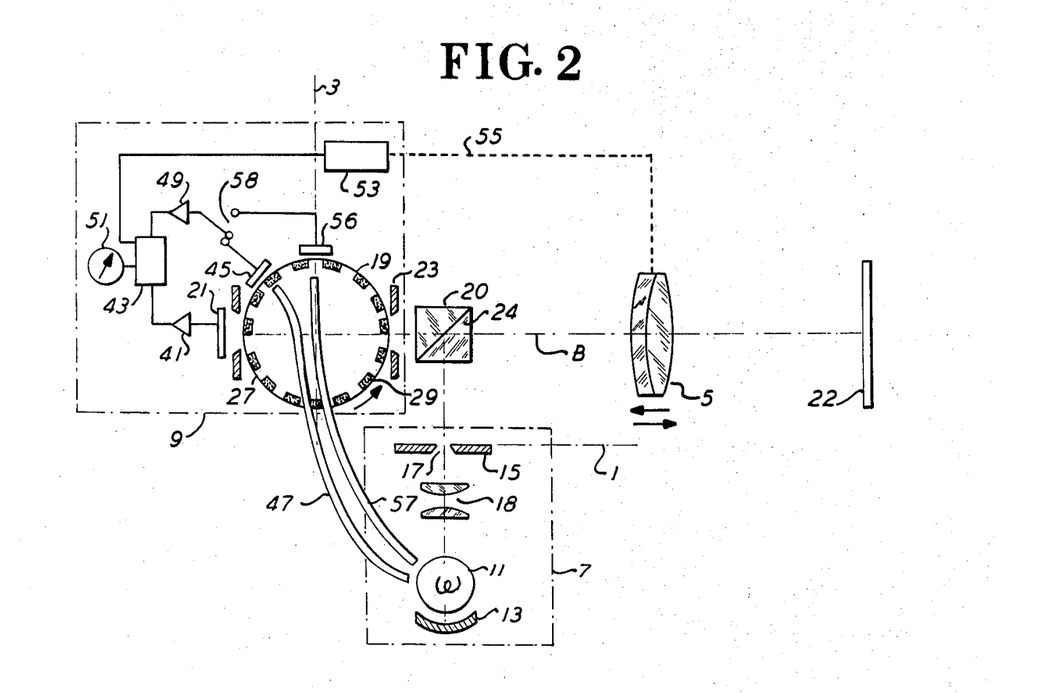
FIG. 2 is a schematic of an alternate configuration of the apparatus shown in FIG. 1.

FIG. 2 shows an alternative arrangement in which the transmitter 7 and receiver 9 are fixed relative to each other and relative to the known object and image planes 1 and 3, preferably equidistant from a beam splitter 20 hereinafter described.

The receiver and transmitter are placed in the same unit so that their positions are fixed with respect to each other. A light beam splitter 20 and mirror 22 or other means is then provided to permit the light beam to pass out of transmitter 7 and pass back into receiver 9.

The beam splitter may consist of a glass cube comprised of two isosceles right triangular prisms having a partially reflecting surface (a coating of reflecting material which is thinner than normally used for mirrors; it is similar to that used on one-way mirrors). The coating is applied on the common hypotenuse 24 of the prisms. Alternatively, the beam splitter may consist of a pellicle (a thin flat plastic membrane which is stretched over a flat frame and is coated with a partially reflecting coating). Either configuration transmits part of the light flux and reflects part of it.

The mirror 22 consists of a conventional reflecting surface (such as silvered glass) which may be specular as mentioned hereafter, and is positioned so that it is in a plane which is perpendicular to the optical axis B of the light emitted from slit 17 and in alignment with lens 5, the beam splitter 20 and chopper 19.

Light from the light source 11 then passes through slit 17 and falls on reflecting surface 24 of beam splitter 20. The light beam will then split the light with about half of the light passing straight through the beam splitter (this can be ignored since it has no effect on the operation), and about half of the light being reflected from the surface 24, and passing through lens 5.

This light will pass through the lens and hit mirror 22. The light passes through the lens in one of two ways. If the lens is positioned at a distance from the slit that is equal to the focal length of the lens, the light passing through the lens will be collimated on the mirror, that is, the light rays will be parallel since the lens will be focused at infinity. These light rays, after impinging on mirror 22 (which is perpendicular to the optical axis of the lens) pass through the lens again whereupon the collimated light is converted to image forming light by the lens. The other way that lens 5 can be positioned is where the distance between the slit and the lens is greater than the focal length of the lens. In this case a real image may be formed on the surface of mirror 22. The light returning from the mirror surface which is diverging is then converted to converging or image forming light by lens 5.

The above will generally be the case when the optical light path from the slit to the beam splitter equals that from the beam splitter to the center of the chopper. When these distances are not substantially equal the device will still operate but the light will not be completely collimated in the former case, as described above, and the image will be formed in front of the mirror instead of on it as in the latter case, described above. However, the rest of the operation will be exactly the same and the image will form at the image plane exactly as before.

In both of the above cases, about half the returning light is transmitted through the beam splitter and passes into the rotating chopper. The other half of the light is reflected by the mirrored surface in the beam splitter towards the light source, however, this light can be ignored since this does not affect the operation of the device.

For the case where a real image is formed on surface 22, it is not a prerequisite that the surface 22 be specular, it is only necessary that sufficient light energy is returned to lens 5. However, for the case where the lens is focused at infinity (the light rays are parallel) its surface must be specular so that the light beam returning from the mirror will be collimated (parallel rays) as is the light beam that hit the mirror. It must be collimated since the image is eventually formed in the chopper by the light returning through the lens from the mirror.

It is important to note that by the use of a beam splitter which is placed on axes for both light from the light source and light reflected back to the sensor, the position of the image at the chopper is doubly sensitive to improper focus shifts. The slightest displacement of the lens from the proper axial position will cause a shift in the focus of the light travelling through the lens not only in one direction but in both directions, thus accentuating the error. This makes detection much easier. By having the light beam pass through the same portion (optical aperture) of the lens in both directions the light beam will be affected by the lens in the same manner in both directions and therefore a more accurate reading of the lens can be taken. If the light beam passed through different portions of the lens in each direction it would be difficult to determine the characteristics of the lens because each of these two portions could have different characteristics and the characteristics could not be separated to determine which belonged to which portion of the lens, e.g., distinguishing between axial and off-axis performance. Further, the concentric arrangement of the elements (they are on the same axis) made possible by the use of the beam splitter permits the optical elements to be realigned longitudinally (shifted) on the optical axis without need to readjust the entire mechanism. In addition the concentric arrangement results in the image at the chopper being the size of the slit at any lens position (where the system is in focus) to thereby permit easier signal processing since there is no magnification (the slit and the image are the same size).

Like numbered components of the systems shown in FIG. 2 and FIG. 1 perform the functions hereinbefore described with reference to the FIG. 1 configuration.

It will be appreciated that where a concave mirror is used instead of a lens, image forming light is reflected directly by such a mirror thus eliminating the need for a reflecting surface.

It will be further appreciated that multiple optical elements may be used in the light path instead of merely one or two to achieve various arrangements for testing both the elements and other systems.

Figure 12:
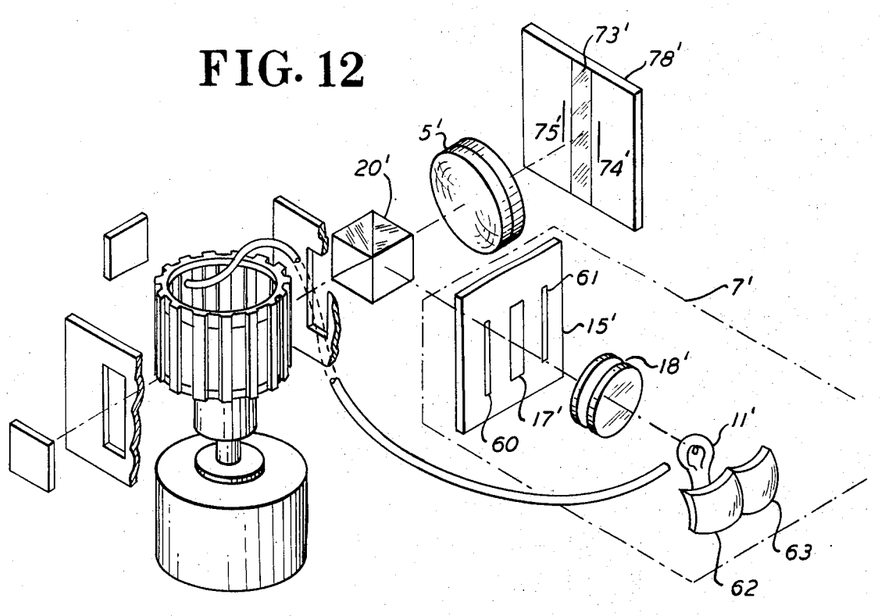
FIG. 12 illustrates a perspective view of an alternative form of the device for determining magnification.

Reference is made to FIG. 12 which shows a transmitter 7' which is equivalent to that described for the FIG. 1 configuration and used with the FIG. 2 configuration except that the light shield 15' provides two additional slits 60 and 61, spaced on either side of slit 17'. These are illuminated by utilizing concave mirror segments 62 and 63 to reimage the filament of lamp 11' at lateral distances from the filament such that these filament images are caused to pass through condensing lens 18' and illuminate slits 60 and 61. With this configuration concave mirror 13, shown in FIG. 2, is eliminated; however, the illumination level at slit 17' is still adequate for the functioning of the apparatus as hereinbefore described.

As in the previously described apparatus, the slit 17' may be imaged on mirror 22' by beam splitter 20' and lens 5. Lens 5' as shown in FIG. 12 will also provide images of the additional illuminated slits 60 and 61 at the surface of mirror 22'. By limiting the width of the mirror coating 73' on mirror 22' such that it is adequate to reflect the image of slit 17' but not so wide as to intercept the images of slits 60 and 61, these are visible through the transparent portion of the glass substrate of mirror 22'. In other words only section 73' of mirror 22' is a mirror, the rest of the 22' is simply transparent glass. Thus, the images 74' and 75' of slits 60 and 61 can be seen from the rear side 78' of the mirror.

The magnification of the system is represented by the distance separating the two transmitted slit images divided by the actual separation of slits 60 and 61. This distance can be measured manually using viewing optics that include a reticle mounted on a micrometer translating feed. Alternatively, the distance between the images of slits 60 and 61 can be measured photoelectrically utilizing a scanning means which utilizes trigger pulses from a sensor or sensors as the slit images are reimaged and caused to translate. Thus the first slit image could be utilized to open an electrical gate that starts a count of high frequency timed pulses. The second slit image is caused to close the gate and the resulting count is proportional to the distance between the two slit images of slits 60 and 61. Since the spacing is fixed, the accumulated pulse count is also proportional to the magnification of the optical system.

Methods of scanning across the surface of mirror substrate 22 include rotating refractive or reflective prisms with fixed reimaging lens and systems which use one or more moving lenses. Other methods of handling the trigger pulse produced by the scanning technique may be devised and used either to display or control the system magnification.

Figure 13:
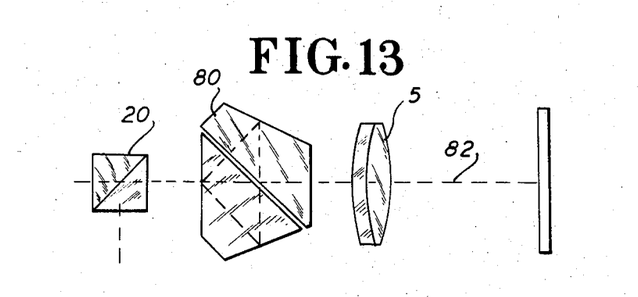
FIG. 13 is an alternative form of the device.

FIG. 13 illustrates another embodiment for determining lateral displacement of a lens. A Pechan prism 80 is inserted into the device of FIG. 2 between the lens 5 and beam splitter 20. The prims is held and rotated either by hand or by a suitable drive means about axis 82 (the optical axis of the system). When the prism is rotated about this axis the prism will rotate the light passing through it about the axis of rotation. Thus when the prism is rotated 45°, the slit light image is rotated 90° and after reflection and return through the prism, the light image is again rotated back to its original orientation. The light image now will pass through the beam splitter and the chopper to be focused at the center of the chopper on the image plane. Thus, by taking a reading of the lens with a Pechan prism in one position a signal can be generated indicating lateral displacement in one axis (such as the X axis). Then, by rotating the prism 45° (this rotates the image 90°) and taking another reading a signal is generated indicating lateral displacement in a perpendicular axis (such as the Y axis). The prism readings can be taken through 360° of rotation. Thus, lateral displacement can be measured in any direction.

Figure 14:
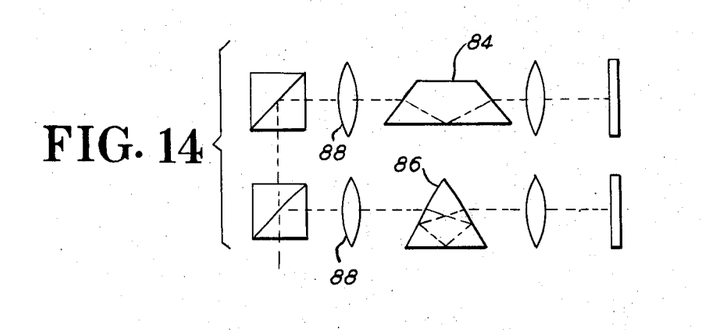
FIG. 14 is an alternative form of the device of FIG. 13.

Other prisms such as a dove prism 84 and a delta prism 86, as shown in FIG. 14 can be used to achieve the same result. With these prisms collimated light has to be used and therefore a second lens is used for this collimation. This lens 88 is inserted between the beam splitter and the prism 20. These prisms, operate in the same manner as described with respect to the Pechan prism. By being rotated they will yield displacement readings in any lateral direction.

The above devices can be used to measure lenses which have two different focal lengths, such as toroidal lenses and are also useful in aligning the two different principal foci in anamorphic lenses.

While specific embodiments of the invention have been described, it will be appreciated that the invention is not limited thereto; as many modifications may be made by one skilled in the art which falls within the true spirit and scope of the invention.

I claim:

1. A device for determining the position of a test optical member in a direction perpendicular to an optical axis and for determining a focus point of said member comprising: source means to generate light radiation that passes through said test optical member and forms an image, which is received by a receiving means; said receiving means, which receives said image, generates electrical signals in response thereto; a predetermined focus point on said optical axis and a predetermined position for said test optical member perpendicular to said optical axis and a standard for receiving a portion of unpassed radiation and generating output signals which, when compared to the output signal of said receiving means, indicate the position of said test optical member with respect to said focus point of said member and said predetermined focus point.

2. The device of claim 1 including means comprising a plurality of slots positioned between the source means and the optical member and wherein the distance between images of the slots will indicate the magnification of the optical member.

3. The device of claim 2 wherein the signal of the receiving means comprises a repeating, fluctuating light flux pattern having a phase which when compared to the standard indicates the direction the optical means is displaced from the predetermined position.

4. The device of claim 3 wherein said receiving means is positioned for the radiation to pass therethrough in generating the repeating, fluctuating light flux pattern.

5. The device of claim 4 wherein said receiver and radiation generating means are located at a predetermined angular relationship with respect to each other, which angular relationship is less than 180°.

6. The device of claim 4 wherein said repeated fluctuating light flux pattern is produced by a rotatable chopper.

7. The device of claim 6 including means responsive to the output signal for repositioning said optical member to the predetermined position.

8. The device of claim 4 wherein said repeated fluctuating light flux pattern is produced by a moving grid.

9. The device of claim 8 wherein a beam splitter and reflecting means are provided, the beam splitter being positioned to direct the radiation from said means for generating radiation through the optical member towards said reflecting means, the reflecting means being positioned to reflect the radiation and direct the radiation through the optical member and through the beam splitter and onto the receiving means.

10. The device of claim 9 wherein the reflecting means comprises a mirror and the optical member comprises a lens.

11. A device for determining the position of a test optical member in a direction perpendicular to an optical axis comprising: source means to generate light radiation that passes through said test optical member and forms an image, which is received by a receiving means; said receiving means receives said image and generates electrical signals in response thereto; a predetermined position for the optical member perpendicular to said optical axis and a standard for receiving a portion of unpassed radiation and generating output signals which when compared to the output signal of said receiving means indicate the position of said test optical member with respect to said predetermined position for said member, means positioned along the optical axis to rotate the image to a plurality of positions for said receiving means to determine the position of the optical member in any of the plurality of positions perpendicular to the optical axis.

12. The device of claim 11 wherein said receiving means is positioned for the radiation to pass therethrough in generating the signal.

13. The device of claim 12 wherein the signal of the receiving means comprises a repeating, fluctuating light flux pattern having a phase which when compared to the standard indicates the direction the optical means is displaced from the predetermined position.

14. The device of claim 13 wherein a beam splitter and reflecting means are provided, the beam splitter being positioned to direct the radiation from said means for generating radiation through the optical member towards said reflecting means, the reflecting means being positioned to reflect the radiation and direct the radiation through the optical member and through the beam splitter and onto the receiving means.

15. The device of claim 14 wherein said means to rotate the image comprises a prism which is positioned between said beam splitter and said lens and is mounted so that by rotating the prism alignment can be determined in more than one direction perpendicular to the optical axis.

16. The device of claim 15 wherein the prism comprises a Pechan prism.

17. The device of claim 15 wherein the prism comprises a delta prism.

18. The device of claim 15 wherein the prism comprises a dove prism.

19. The device of claim 9 wherein said reflecting means comprises a mirror having a central reflecting area and two side transmitting areas, and wherein the means for generating radiation includes a member having two slits, the radiation passing through the two slits and through the optical member to produce images on the reflecting means on each side of the central reflecting area to thereby determine the magnification of the optical member.

* * * * *

UNITED STATES PATENT OFFICE
CERTIFICATE OF CORRECTION

Patent No. 3,813,169          Dated May 28, 1974

Inventor(s)     Paul T. Kaestner

It is certified that error appears in the above-identified patent and that said Letters Patent are hereby corrected as shown below:

Column 5, line 12, "optumum" should read -optinum-.

Column 5, line 66, "consits" should read -consists-.

Column 8, line 12, "pulse" should read -pulses-.

Column 8, line 18 "prims" should read -prisms-.

Signed and sealed this 7th day of January 1975.

(SEAL)
Attest:

McCOY M. GIBSON JR.
Attesting Officer

C. MARSHALL DANN
Commissioner of Patents